United States Patent
Hilpert et al.

(10) Patent No.: US 10,161,824 B2
(45) Date of Patent: Dec. 25, 2018

(54) HYDROSTATIC PRESSURE TEST METHOD AND APPARATUS

(71) Applicant: HilFlo, LLC, Conroe, TX (US)

(72) Inventors: Clifford Lee Hilpert, Conroe, TX (US); Jeffrey Lee Hilpert, Conroe, TX (US); Lewis Jackson Dutel, Huston, TX (US); Laura Tufts Meyer, Sealy, TX (US)

(73) Assignee: HilFlo, LLC, Conroe, TX (US)

( * ) Notice: Subject to any disclaimer, the term of this patent is extended or adjusted under 35 U.S.C. 154(b) by 129 days.

(21) Appl. No.: 15/151,309

(22) Filed: May 10, 2016

(65) Prior Publication Data

US 2016/0334298 A1 Nov. 17, 2016

Related U.S. Application Data

(60) Provisional application No. 62/159,426, filed on May 11, 2015.

(51) Int. Cl.
| | |
|---|---|
| *G01M 3/02* | (2006.01) |
| *E21B 33/06* | (2006.01) |
| *E21B 36/00* | (2006.01) |
| *F28F 9/26* | (2006.01) |
| *F28F 27/00* | (2006.01) |

(52) U.S. Cl.
CPC ............ *G01M 3/02* (2013.01); *E21B 33/06* (2013.01); *E21B 36/00* (2013.01); *F28F 9/26* (2013.01); *F28F 27/00* (2013.01)

(58) Field of Classification Search
CPC .. G01M 3/2892; G01M 3/022; G01M 3/2807; G01M 3/2815; G01M 3/2853; G01M 3/2876
See application file for complete search history.

(56) References Cited

U.S. PATENT DOCUMENTS

| | | | | |
|---|---|---|---|---|
| 3,827,282 A | * | 8/1974 | Brister | 138/97 |
| 3,978,709 A | * | 9/1976 | Ando | F17D 5/02 |
| | | | | 73/40.5 R |
| 5,090,234 A | * | 2/1992 | Maresca, Jr. | G01M 3/2892 |
| | | | | 73/40.5 R |
| 5,315,862 A | * | 5/1994 | Hasselmann | G01M 3/2892 |
| | | | | 73/40.5 R |
| 5,557,965 A | * | 9/1996 | Fiechtner | G01M 3/007 |
| | | | | 73/40.5 R |
| 6,131,441 A | * | 10/2000 | Berube | G01M 3/022 |
| | | | | 138/89 |
| RE42,358 E | * | 5/2011 | Tucker | F16L 1/26 |
| | | | | 73/49.5 |
| 2007/0169543 A1 | * | 7/2007 | Fazekas | G01M 3/2815 |
| | | | | 73/49.2 |
| 2014/0241810 A1 | * | 8/2014 | Lynch | F16L 1/26 |
| | | | | 405/170 |

(Continued)

*Primary Examiner* — David A Rogers
(74) *Attorney, Agent, or Firm* — Tumey L.L.P.

(57) ABSTRACT

A method of pressure testing a closed hydraulic system for leaks includes heating or cooling pressure intensification fluid before it enters the closed hydraulic system under pressure. The closed hydraulic system may be for example a blowout preventer for an oil/gas well, a manifold system or tubulars. The intensification fluid is heated or cooled to a temperature at or near the temperature of the fluid within the closed hydraulic system.

7 Claims, 2 Drawing Sheets

(56) References Cited

U.S. PATENT DOCUMENTS

| | | | | |
|---|---|---|---|---|
| 2014/0274557 A1* | 9/2014 | Chong | ............... | E21B 47/10 |
| | | | | 477/79 |
| 2016/0084392 A1* | 3/2016 | Horton | ............... | F16K 11/00 |
| | | | | 137/12 |
| 2016/0290889 A1* | 10/2016 | Hilpert | ............... | E21B 33/06 |

* cited by examiner

HYDROSTATIC PRESSURE TEST METHOD AND APPARATUS

CROSS-REFERENCE TO RELATED APPLICATIONS

This application claims priority to provisional application Ser. No. 62/159,426 filed May 11, 2015, the entire contents of which is expressly incorporated herein by reference thereto.

I. BACKGROUND OF THE INVENTION

1. Field of the Invention

This invention is directed toward a method of testing blowout preventers (BOP) located at a well head to prevent unrestricted flow of gas and or oil from a well during an emergency situation.

Oil and Gas Exploration risk management includes the ability to control subsurface pressures which may be encounter during drilling operation. The primary mechanism utilized by operators to control downhole pressures is the hydrostatic pressure as a result of the drilling fluid contained within the wellbore. The drilling fluid is engineered and formulated to a density that provides a hydrostatic pressure inside of the wellbore that is greater than the formation pressure being drilled. In the majority of drilling operations, the hydrostatic control of wellbore pressure is adequate. However, from time-to-time the operator may encounter a higher than expected formation pressure where there is not adequate hydrostatic pressure to control the wellbore pressure. During these times the operator relies on a series of mechanical controls to stabilize the wellbore and prevent a "Blow Out". A blow out is the uncontrolled release of fluid or gas from the wellbore. This event is extremely dangerous and therefore must be avoided if at all possible. The primary mechanical control device utilized by operators to control wellbore pressure is the Blowout Preventer (BOP) assembly. The BOP assembly consists of multiple sealing and shearing devices that are hydraulically actuated to provide various means of sealing around the drill string or shearing it off entirely, completely sealing the wellbore. It is essential that the BOP assembly operate as designed during these critical operations. Therefore it is a regulatory requirement to test the functionality and the integrity of the BOP assembly before starting drilling operations and at specific events during the drilling operations.

2. Description of Related Arts Invention

The BOP assembly test is a series of pressure tests typically at a minimum of two pressure levels, low pressure and high pressure. During the pressure test, intensification fluid from a high pressure intensification pump is introduced into the closed BOP assembly in a volume sufficient to cause the internal pressure within the closed BOP assembly to rise to the first pressure test level. Once the first pressure test level is established the high pressure intensification pump is isolated from the closed BOP assembly and the pressure is monitored for a specified time period. During the monitoring phase the pressure decay is determined and compared to the pressure decay specification. A typical specification for compliance allows for a pressure decay rate of no more than 5 psi/minute or 25 psi total over the entirety of the five minute test.

Measuring leak rate utilizing the indirect result of pressure decay, while widely accepted, is problematic. This is especially apparent when performing BOP assembly tests offshore in deeper waters. In a typical offshore configuration the BOP assembly will be located at the sea floor. The distant between the BOP assembly and the drilling platform at the surface can reach upwards of 10,000 feet. The BOP assembly is connected to the drilling platform via tubular pipe sections typically referred to as the "riser assembly". The drill string is a series of tubular pipes attached to the drilling platform at one end and the drill bit or service assembly at the opposite end. The drill string is positioned within the riser assembly. During a typical BOP hydrostatic test the drill string and riser assembly are filled with drilling fluid. The BOP is configured for the applicable hydrostatic test which acts to close off or seal the drill string. A high pressure intensification pump, typically the cement pump, is aligned so as to add additional drilling fluid, or other suitable intensification fluid, via the open end of the drill string drill string at the drilling platform, in a volume sufficient to cause the pressure within both the BOP assembly and the drill string to rise to the appropriate test pressure. The volume of drilling fluid required to raise the pressure within the BOP assembly and the drill string to the applicable level is related to the compressibility of the drilling fluid within the BOP assembly and drill string as well as the intensification fluid. For example: a typical offshore BOP assembly and the drill string might require approximately 100 bbls of drilling fluid to completely fill the area between the BOP assembly and the drilling platform. Typical drilling fluids used in offshore drilling have a compressibility factor of approximately 0.0035/1000 psi. A typical BOP assembly test pressure might be 5,000 PSI. Therefore in this example the additional volume of intensification fluid required to raise the internal pressure of the BOP assembly and the drill string is 1.75 bbls. If the required test pressure of the BOP assembly is 10,000 psi, the additional volume of intensification fluid required to raise the internal pressure of the BOP assembly and the drill string is 3.5 bbls.

In most cases a high pressure reciprocating intensification pump is utilized to pump the required additional drilling fluid into the BOP assembly and drill string. The action of pumping intensification fluid from an ambient pressure to a significantly high pressure, sometimes in excess of 20,000 psi creates heat. The heat is principally generated by mechanical inefficiencies of the intensification pump and the compressive strain of the drilling fluid. The temperature rise subsequent to the intensification pump is a function of the pressure differential and the volume of drilling fluid pumped. In some cases the temperature of the intensification fluid can rise as much as 40 deg F. The temperature rise has a significant effect on the volume/pressure relationship within the BOP assembly and the drill string due to the thermal coefficient of expansion of the intensification fluid. The thermal coefficient of expansion of intensification fluids and drilling fluids varies greatly but a typically might have a thermal coefficient of expansion of approximately 0.0003 per degree Fahrenheit. Therefore if during the pressurization phase of the BOP pressure test, the intensification fluid temperature is raised approximately 30 degrees F. by the intensification pump, the volume will increase approximately 0.009 or approximately 1%.

Referring to the previous example above where approximately 3.5 bbls of intensification fluid was added to the BOP assembly and the drill string to raise the pressure to approximately 10,000 psi will equate to a pressure increase slope of approximately 2850 psi/bbl of intensification fluid added. Referring to the previous example above where a 30 degree F. increase in intensification fluid temperature results in approximately a 1% increase in volume will further equate to 0.035 bbls (3.5×0.01=0.035).

Subsequent to pumping, the heated intensification fluid will cool at a rate defined by the general thermal conductivity of the surrounding environment. As the intensification fluid cools there is a corresponding reduction in volume equal to the previous thermally induced volume increase. The reduction in volume causes the pressure to decrease at a rate approximately equal to the pressure slope previously described. In this example the decrease in pressure would be approximately 100 psi over the period of time necessary for the temperature of the intensification fluid to return to ambient. This period of time can be as little as 5 minutes to as much as 20 minutes. During this time the pressure decay rate exceeds the limit of 5 psi/minute. Therefore the pressure test of the BOP assembly cannot begin until the pressure decay has stabilized at a rate less than 5 psi/minute. This period of time is known within the industry as "waiting on a flat line". Once the pressure decay stabilizes at or below 5 psi/minute the BOP pressure test can begin.

It would be desirable to eliminate the affects of the temperature increase in the pressurizing fluid. This would increase the accuracy of the test and also reduce the amount of time required for each test segment. This would greatly decrease the cost of BOP testing.

Additionally, in certain environments where the ambient temperature is cold, it may be necessary to further heat rather than cool the intensification fluid so that it is approximately equal to the temperature of the BOP assembly or other closed hydraulic systems. In certain testing situations the BOP assembly may not contain fluid or it may be partially or completely filled with fluids.

In any case the temperature of the BOP assembly is measured and the intensification fluid is heated or cooled as necessary to match the temperature of the BOP assembly or other closed hydraulic system.

II. BRIEF SUMMARY OF THE INVENTION

The present invention overcomes the above noted problems by cooling or heating the intensification fluid prior to pressurizing the BOP or other closed hydraulic systems to the test pressures. This may be accomplished by the use of a heat exchanger which is positioned either upstream or downstream of the intensification pump. In the case of a subsea oil well, sea water may be utilized as the heat exchange fluid for the heat exchanger. The intensification fluid is either heated or cooled to match the temperature of the BOP assembly.

III. BRIEF DESCRIPTION OF SEVERAL VIEWS OF THE DRAWINGS

For a detailed description of the preferred embodiments of the invention, reference will now be made to the accompanying drawings in which.

IV. DETAILED DESCRIPTION OF THE INVENTION

Figure 1:
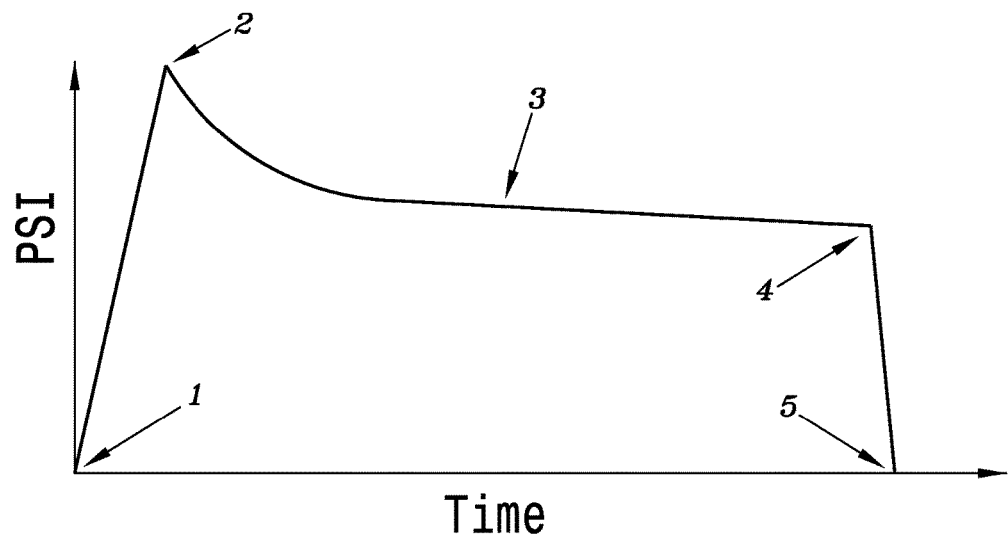
FIG. 1 illustrates the pressure verses time curve for a test cycle of the prior art.

FIG. 1 depicts a pressure recording chart from a typical BOP assembly hydrostatic pressure test method. It is defined by four distinct phases. The period between point 1 and point 2 is the pressurization phase. The period between point 2 and point 3 is the first step of the monitoring phase. The period between point 3 and point 4 is the second step of the monitoring phase. The period between point 4 and point 5 is the dump phase where pressure is released to complete the hydrostatic test process. The first phase, the pressurization phase, is the period where intensification fluid is added to the drilling fluid within the closed BOP assembly and the drill string to increase the pressure to a level sufficiently above the applicable test pressure to allow for the pressure decay associated with temperature decay while remaining above the applicable hydrostatic test level. It is during this pressurization phase that the intensification fluid added is also heated from the inefficiencies of the intensification pump and the compressive strain of the drilling fluid.

Immediately subsequent to the pressurization phase, the first step of the monitoring phase begins. It is during this step of the monitoring phase that the intensification fluid added by the intensification pump is cooling. As time passes the intensification fluid continues to cool until it is very near the temperature of the sounding environment. Subsequently the next step, step 2, of the monitoring phase begins. It is during this phase that a determination about the integrity of the BOP assembly (leak-no leak) based on the pressure decay rate will be made. The BOP assembly is considered to be safe to use if the pressure decay rate is less than 5 psi/min. Subsequent to the monitoring phase the pressure is released during the dump phase from point 4 to point 5.

The first step of the monitoring phase can be as little as five minutes to as much as twenty minutes depending on how long it takes the pressurizing fluid to cool to ambient conditions.

Figure 2:
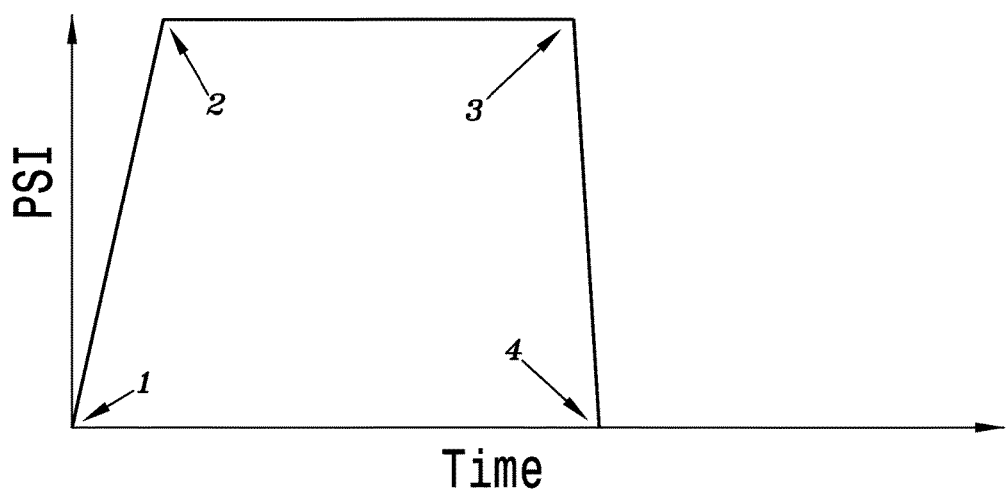
FIG. 2 illustrates a time the pressure verses time curve for a test cycle according to an embodiment of the invention.

FIG. 2 depicts a pressure recording chart of the new and improved BOP assembly hydrostatic pressure test method. It is defined by three distinct phases. The period between point 1 and point 2 is the pressurization phase. The period between point 2 and point 3 is the monitoring phase. The period between point 3 and point 4 is the dump phase where pressure is released to complete the hydrostatic test process. The first phase, the pressurization phase, is the period where intensification fluid is added to the drilling fluid within the closed BOP assembly and the drill string to increase the pressure within the BOP assembly and the drill string to applicable test pressure. It is during this pressurization phase that the intensification fluid added is also heated from the inefficiencies of the intensification pump and the compressive strain of the drilling fluid. However unlike typical BOP hydrostatic test methods, the new and improved hydrostatic test method provides a means of reducing or eliminating the temperature rise within the intensification fluid experienced during pressurization normally associated with hydrostatic testing. Immediately subsequent to the pressurization phase, the monitoring phase begins. It is during this phase that a determination about the integrity (leak-no leak) based on the pressure decay rate is made. The BOP assembly is considered to be safe to use if the pressure decay rate is less than 5 psi/min.

Subsequent to the monitoring phase the pressure is released during the dump phase. It is important to note that it is not necessary to include a step of the monitoring phase that would allow time for the temperature of the added intensification fluid to stabilize at or near the ambient temperature of the drilling fluid within the BOP assembly and drill string. Therefore, BOP hydrostatic test method with temperature stabilization will save a substantial amount of test time and money when compared to typical hydrostatic testing without temperature stabilization.

Figure 3:
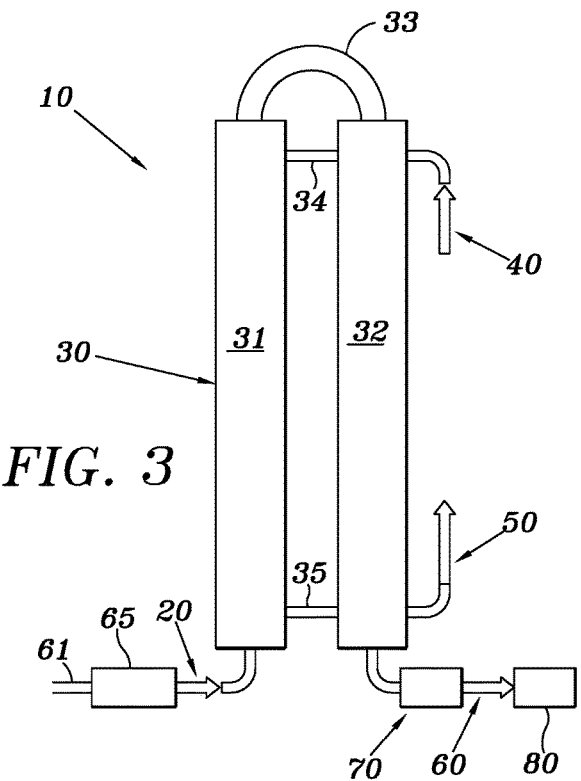
FIG. 3 illustrates apparatus according to a first embodiment of the invention.

FIG. 3 depicts an embodiment of the improved hydrostatic test method which includes heat exchange system 10 downstream of the intensification pump and before the drill string connection. Heat laden intensification fluid received at fluid intake nozzle 20 from the intensification pump would pass through heat exchanger 30 exiting out of fluid discharge nozzle 60. Cold sea water introduced at fluid nozzle 40 will pass through heat exchanger 30 exiting fluid discharge nozzle 50. As a function of heat exchanger 30 the heat induced into the intensification fluid by the intensification pump 65 will be transferred to the cooler sea water as both fluids come in contact with the heat transfer medium of heat exchanger 30. An alternate embodiment to the method might utilize a chilled water loop to replace of the cool sea water as the cooling liquid. Heat exchange system 10 may be manually operated or with the inclusion of optional temperature sensor 70 automatically operated to regulate the heat transfer rate. Cooled intensification fluid is then directed to BOP assembly 80.

Heat exchanger 30 may include two units 31 and 32 each having heat transfer coils within them. A connector 33 connects units 31 and 32 for the intensification fluid to be cooled while connectors 34 and 35 may be used for the cooling fluid in the cooling coils. Any well-known heat exchange unit may be employed to cool the intensification fluid.

In this embodiment inlet 20 is connected to the intensifying pump 65 and outlet 60 is connected to the drill string and blowout preventer assembly 80. The intensification fluid is cooled to a temperature approximately equal to the temperature of the BOP assembly.

Figure 4:
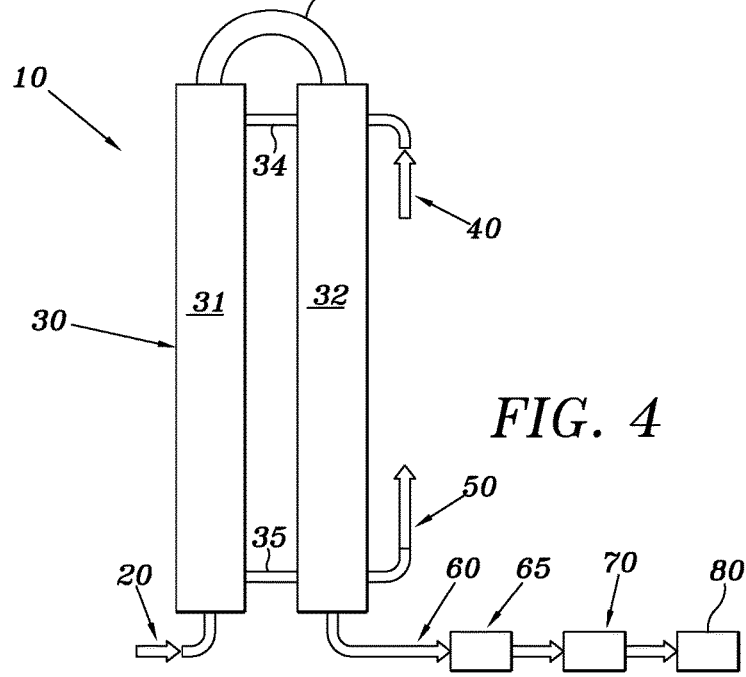
FIG. 4 illustrates apparatus according to second embodiment of the invention.

FIG. 4 depicts a second embodiment of heat exchange system 10 which includes heat exchanger 30 prior to the fluid inlet of the intensification pump 65. In this second embodiment intensification fluid is introduced into heat exchanger 30 via fluid intake nozzle 20. Intensification fluid received at intake nozzle 20 will pass though heat exchanger 30 exiting via fluid discharge nozzle 60. Chilled water introduced into heat exchanger 30 via fluid intake nozzle 40 will pass through heat exchanger 30 exiting fluid discharge nozzle 50. The chilled water will be sufficiently cool to reduce the intensification fluid temperature to a temperature approximately equal to the temperature of the BOP assembly. The reduction of the intensification fluid temperature is a function of heat exchanger 30 as the intensification fluid and the chilled water come into contact with each other across the heat transfer medium of heat exchanger 30. Heat exchange system 10 may be manually operated or with the inclusion of optional temperature sensor 70 automatically operated to regulate the heat transfer rate. Fluid from outlet 60 in this embodiment is directed to the inlet of the intensifying pump 65 and then to BOP assembly 80. In this embodiment heat exchanger 30 may be of the same type as described above with respect to FIG. 3.

In the situation where it is desirable to further heat the intensification fluid, heat exchange 30 would be of the type that raised the temperature of the intensification fluid such as an electrical fluid heater unit.

In either situation the temperature of the BOP assembly is measured and the heat exchange unit is controlled so that the temperature of the intensification fluid matches that of the BOP assembly.

The principles, preferred embodiment, and mode of operation of the present invention have been described in the foregoing specification. It will be obvious to those skilled in the art that variations may be utilized for similar closed vessel hydrostatic testing such as well heads, tubulars, and manifolds. This invention is not to be construed as limited to the particular forms disclosed, since these are regarded as illustrative rather than restrictive. Moreover, variations and changes may be made by those skilled in the art without departing from the spirit of the invention.

The above detailed description of the related embodiments of the improved BOP hydrostatic test method is intended as an exemplification of the principals of the invention and not intended to limit the invention to any specific embodiment. The improved BOP hydrostatic test method provides for a means of cooling or heating the intensification fluid either before or after the intensification pump so that subsequent to the pressurization phase the intensification fluid added to cause the pressure increase is at or near the ambient temperature of the BOP assembly. This method of stabilizing the intensification fluid temperature at or near the ambient temperature of the BOP assembly will mitigate the effects of the temperature decay and associated pressure decay immediately subsequent to the pressurization phase of the hydrostatic test.

Although the present invention and its advantages have been described in detail, it should be understood that various changes, substitutions and alterations may be made herein without departing from the spirit and scope of the invention as defined by the appended claims.

What is claimed is:

1. A method of pressure testing a closed hydraulic system for leaks comprising:
   a) initiating a flow of intensification fluid under pressure to the closed hydraulic system to establish a first pressure level within the closed hydraulic system,
   b) cooling or heating the intensification fluid to a level corresponding to the temperature of the closed hydraulic system,
   c) isolating the closed hydraulic system from the pressurized testing fluid, and
   d) measuring any pressure changes within the closed hydraulic system,
      wherein the intensification fluid is pressurized by an intensification pump and the intensification fluid is cooled or heated prior to entering the intensification pump.

2. The method of claim 1 wherein the closed hydraulic system is a blowout preventer positioned on a subsea oil/gas well.

3. The method of claim 1 wherein the closed hydraulic system is a blowout preventer for a surface oil/gas well.

4. The method of claim 1 wherein the testing fluid is pressurized by an intensification pump and the intensification fluid is cooled or heated after it exits the intensification pump.

5. The method of claim 1 wherein the closed hydraulic system is a blowout preventer for an oil/gas well which includes a drill string and the intensification fluid is cooled or heated to be at or near the ambient temperature of the drilling fluid within the drill string and the blowout preventer.

6. The method according to claim 2 wherein the intensification fluid is cooled or heated by a heat exchanger and the heat exchange fluid is seawater.

7. A method of pressure testing a blowout preventor positioned on a subsea oil/gas well for leaks comprising:
   a) initiating a flow of intensification fluid under pressure to the closed hydraulic system to establish a first pressure level within the closed hydraulic system, b) cooling or heating the intensification fluid to a level corresponding to the temperature of the closed hydraulic system,
c) isolating the closed hydraulic system from the pressurized testing fluid, and
d) measuring any pressure changes within the closed hydraulic system, wherein the intensification fluid is cooled or heated by a heat exchanger and the heat exchange fluid is seawater.

* * * * *